United States Patent [19]

Crawford et al.

[11] 3,776,697

[45] Dec. 4, 1973

[54] METHOD AND REAGENT FOR DETERMINING NITROGEN OXIDES

[75] Inventors: Richard W. Crawford; Lester P. Rigdon, both of Livermore, Calif.; Richard J. Thompson, Hillsborough, N.C.

[73] Assignee: The United States of America as represented by the United States Atomic Energy Commission, Washington, D.C.

[22] Filed: Apr. 13, 1972

[21] Appl. No.: 243,877

[52] U.S. Cl. .............................. 23/232 R, 252/408
[51] Int. Cl. ............................................. G01n 31/22
[58] Field of Search .................... 23/232 R; 252/408

[56] References Cited
UNITED STATES PATENTS

| | | | |
|---|---|---|---|
| 3,375,079 | 3/1968 | Lyshkow | 23/232 R |
| 3,512,937 | 5/1970 | Schulze | 23/232 R |
| 3,574,552 | 4/1971 | Rakowski | 252/408 X |

Primary Examiner—Robert M. Reese
Attorney—John A. Horan

[57] ABSTRACT

A measured quantity of gas such as atmosphere containing nitrogen oxides is contacted with Hochheiser solution comprising dilute base with or without a foaming agent, however, now containing small amounts of $OsO_4$, $XeO_3$ or perxenate whereupon at least about 90 to 95 percent of the $NO_2$ is absorbed yielding nitrate and nitrite in the solution. Nitrate may then be converted to nitrite as by reduction in a cadmium amalgam cell. Then the amount of nitrite is determined photometrically using Saltzman's reagent comprising n-(1-naphthyl)-ethylene diamine and sulfanilic acid which forms a dye specifically with $-NO^-_2$. The collection efficiency of the Hochheiser solution is increased from 25–70 percent to above 90 percent yielding a more accurate indication of $NO_2$ content.

9 Claims, No Drawings

METHOD AND REAGENT FOR DETERMINING NITROGEN OXIDES

BACKGROUND OF THE INVENTION

The invention herein was made under, or in, the course of Contract No. W-7405-ENG-48 with the United States Atomic Energy Commision.

FIELD OF THE INVENTION

The determination of nitrogen oxides in effluent gases from various equipment or in the atmosphere is of interest in various industrial operations as well as for determining atmospheric pollution and products of industrial processes.

Two techniques are widely used to sample air for nitrogen oxides. For discrete sampling, the air is pumped through a fritted glass tube that is immersed in an absorbing solution. The resulting bubbles pass through the solution, thereby providing the necessary gas/liquid interface for a chemical reaction. (c.f.

M. B. Jacobs and S. Hochheiser, *Anal. Chem.* 30, 426 (1958).

G. B. Morgan, C. Golden, and E. C. Tabor, "New and Improved Procedures for Sampling and Analysis in the National Air Sampling Network," in *Automation in Analytical Chemistry* (Mediad, Inc., White Plains, N. Y., 1966, Vol. 1, pp. 526–533.

B. E. Saltzman, *Anal. Chem.* 26, 1949 (1954).

F. P. Scaringelli, F. Rosenberg, and K. A. Rehme, *Environ. Sci. Technol.* Vol. 4, No. 11, 924 (1970).

For continuous monitoring, the air is passed directly over the flowing absorption solution in a spiral coil. (c.f.

L. Pierce, Y. Tokima, and K. Nishikawa, *J. Air Pollut. Contr. Ass.* 15, 204 (1965).

Hochheiser's solution, which consists of 0.1-M NaOH and a foaming agent, is commonly used to collect discrete field samples. This solution converts only $35 \pm 5$ percent of the $NO_2$ to nitrite ions ($NO_2^-$) plus some nitrate ions ($NO_3^-$). The overall conversion efficiency is 30 to 50 percent and is somewhat dependent on the pore size of the fritted bubbler and on the foaming characteristics of the solution. Nitrite can be determined alone or as the sum of nitrite plus nitrate by reducing the nitrate before analysis.

A second medium is Saltzman's solution, which is useful for both discrete sampling and continuous monitoring. The diazotizing and coupling reagents are mixed with a buffered solution so that the diazo dye forms continuously as the sample is collected. This reagent converts about 72 percent of the $NO_2$ gas to the diazo dye, but both the reagent and the dye are unstable and the samples must be analyzed soon after they are collected.

Both solutions react only with $NO_2$; any NO present in the gas phase must first be oxidized to $NO_2$. The efficiency with which Hochheiser's solution absorbs $NO_2$ is low and variable, requiring careful control of pore size and foaming characteristics to obtain reasonable reproducibility. Also, Saltzman's solution is not stable enough for field use.

A need therefore exists for a reagent which can absorb greater proportions of the nitrogen oxides, have improved stability and otherwise be adapted to provide more complete, reliable and accurate determinations of nitrogen oxides in a gaseous mixture.

SUMMARY OF THE INVENTION

The invention relates, generally, to the determination of nitrogen oxides in gaseous atmospheres and, more particularly, to such a determination wherein more complete and accurate absorption of nitrogen dioxide is effected by means of a Hochheiser reagent containing small amounts of $OsO_4$, $XeO_3$ or perxenate.

A general object of the invention is to provide a procedure using an improved dilute alkaline reagent for more accurately determining nitrogen dioxide content of a gaseous material.

Another object of the invention is to provide an improved procedure for determining nitrogen dioxide in a gaseous atmosphere wherein the gaseous atmosphere is contacted with a Hochheiser type solution containing from about $2 \times 10^{-5}$ M to about $3 \times 10^{-5}$ M of $OsO_4$, $XeO_3$ or saturated $XeO_6^{4-}$ (perxenate) to absorb at least about 90 to 95 percent of the nitrogen oxides therefrom, the absorbate is electively subjected to a reducing treatment to convert any $NO_3^-$ therein to nitrite, wherein there is then added n-(1-naphthyl)-ethylene diamine and sulfanilic acid to convert the nitrite into a diazo dye, and then colorimetrically determining the nitrite content of the solution to indicate the nitrogen oxide content of the initial gaseous atmosphere.

Other objects and advantageous features of the invention will be apparent in the following description:

DESCRIPTION OF A PREFERRED EMBODIMENT

A predetermined quantity of Hochheiser type absorbent reagent containing an additive agent in accordance with the invention may be contacted with a measured atmospheric sample containing nitrogen oxides, particularly $NO_2$, in a variety of known absorbing or sampling apparatus. One type of such apparatus is the sequence sampler described at pages 426–428, Volume 30, No. 3, March 1958, of "Analytical Chemistry." See also "Archives of Environmental Health," March 1962, Volume 4, pp 254–258, which describes the "National Air Sampling Network Gas Sampler," a modified version of which is used by the Environmental Protection Agency (EPA). Another system including static and dynamic scrubbers is disclosed in UCRL-51057, a report originated by Lawrence Livermore Laboratory, Livermore, California, and authored by Lester P. Rigdon and Richard W. Crawford. Any such air sampling or gas scrubbing apparatus providing adequate contact between the solution and atmospheric sample may be used.

The Hochheiser type reagent may comprise about 0.1 M NaOH and a foaming agent, e.g., 0.2 volume percent n-butyl alcohol as in usual practice. However, the foaming agent is generally not required with the present reagent since absorption efficiency is so markedly increased. The concentrations of NaOH may be varied over a range of at least about 0.05 to about 0.25 molar.

The Hochheiser solution is modified, in accordance with the invention, by addition of particular agents, the preferred additive comprising osmium tetroxide ($OsO_4$) in amounts of at least about $2 \times 10^{-5}$ M to at least about $4 \times 10^{-4}$ M, where above additional amounts generally do not increase absorption efficiency. Absorption efficiencies of the order of 95 percent are consistently obtained using this agent. Other additives which are effective are $XeO_3$ in similar amounts as $OsO_4$ and saturated solutions of $Na_4XeO_6$ (perxenate) which has a low solubility in the reagent.

The manner in which the additives operate is not entirely understood. They are strong oxidizing agents; however, the major proportion of the $NO_2$ is adsorbed to yield nitrite, a reduced form, rather than $NO_3^-$. It is believed that the absorbing improving action may be catalytic in nature which is rather surprising since an oxidation reaction might well be expected to occur in view of the oxidizing nature of the additive agent. About 90 to 95 percent of the $NO_2$ is absorbed to form nitrite.

The absorbate or an aliquot thereof may then be analyzed by adding a coupling agent such as n(1-naphthyl)-ethylene diamine dihydrochloride and sulfanilic acid in dilute acetic acid solution to form a diazo dye which is determined colorimetrically. The absorbate solution may also be treated with cadmium amalgam at a pH of about 8.2 to 8.8 to reduce any nitrate formed during absorption to nitrite so that the total $NO_2$ may then be determined. Nitrite or nitrite plus nitrate formed during absorption may accordingly be determined. The pH of the final solution should have a value of about 1.9 to 2.3 for maximum color development.

Calibration curves for colorimetrically indicating the nitrogen oxide content of the absorbate and consequently of the atmosphere can be constructed by adding known amounts of $NaNO_2$ or $NaNO_3$ standard solution to the Hochheiser solution and/or to contact known volumes of atmospheres containing known quantities of $NO_2$ with the reagent of the invention. NO does not appear to interfere with the $NO_2$ determination.

Further details illustrating the manner in which the reagent of the invention is employed will be set forth in the following specific examples.

Apparatus of the character described in the aforesaid report UCRL-51057 was used. Such apparatus includes a gas calibration portion for preparing appropriate gas mixtures by intermixing regulated flows of $NO_2$ with $N_2$ or air as well as a scrubbing and analysis section. The latter section included fritted glass scrubbers containing measured volumne of the reagents being compared, followed in sequence by a glass coil dyamic scrubber through which Saltzman's solution at a rate of 1.4 ml/min was directed to determine any residual $NO_2$ passing through the static scrubbers. 1.0 ml/min of the Saltzman absorbate was directed through a colorimeter connected to a recorder to indicate residual $NO_2$ content in the gas passing through the fritted glass absorbers.

The research manifold, as described in UCRL-51057, was used so that the rate of flow of $NO_2$ could be selected and maintained, and thus the total amount of $NO_2$ for a given time could be calculated. Also, a pure carrier gas could be used so no interfering species would come in contact with the solution. Dry, compressed tanks of commercial $N_2$ and air were used as the carrier gas. The $NO_2$ gas was obtained from the $NO_2$ permeation tube described in UCRL-51057.

Each experiment was started by setting a flow of about 400 ml of carrier gas and a calculated amount of $NO_2$ per minute, then starting the Saltzman's reagent flow in the coil scrubber and the continuous flow analyzer with the fritted glass absorbers switched out of the system. The system was allowed to run until the flow and analytical system reached a steady state. The analysis was then compared with, and verified the pre-set rate of flow of $NO_2$. It should be noted that the rate of flow of the carrier gas does not affect the rate of flow of $NO_2$, and that changing the rate of flow of the carrier gas changes the concentration of $NO_2$ in the gas mixture. The rate of flow of the carrier gas is not critical, and was selected to optimize the efficiency of the scrubbing coil. The stopcocks were then turned so as to force the gases through the fritt immersed in the scrubbing solution. The fritt serves to disperse the gas and provide contact with the solution. The gases were passed through the solution to the coil scrubber and were continuously analyzed. By observing the continuous analyzer one could calculate the amount of $NO_2$ passing through the fritt (static) scrubber. At the end of a run the static scrubber was switched out of the gas stream, and the rate of $NO_2$ flow again verified by the continuous analyzer. The rate of flow of $NO_2$ was assumed to have been constant if the continuous analyzer showed the same value for $NO_2$ at the beginning and end of the sampling period, and further that these values agreed with the flow rate calculated for the flow rate settings.

The static scrubbing solutions were quantitatively transferred to a volumetric flask and diluted to a known volume with the same concentration of NaOH solution as the test solution. The solution was then analyzed for nitrite and for nitrite plus nitrate. A blank scrubbing solution of the same composition as the test solution was used to establish the zero base line for the analysis. The percent scrubbing efficiency of the test solution was then calculated by comparing the total $NO_2$ flow during the test period to the total nitrite plus nitrate found in the solution.

MOre particularly, the absorbate was analyzed for nitrite utilizing proportioning pumps which mixed 1.20 ml/min of sample, 0.80 ml/min of air and 0.60 ml/min of reagent which was passed through the colorimeter to yield the concentration of nitrite therein. For determining nitrite plus nitrates, samples of the absorbate were mixed in proportions of 1.20 ml/min to 0.32 ml/min of buffer yielding a pH of 8.5 therein which was then passed through a cadmium amalgam reduction cell and then treated as in the case of the nitrite analysis.

REAGENTS

All organic chemicals are Eastman Red Label reagents. Other chemicals are reagent grade and are selected for low nitrate and nitrite impurities. Deionized water is used to prepare all solutions.

STOCK COUPLING REAGENT

Dissolve 1 g of n-(1-naphthyl)-ethylene diamine dihydrochloride in 1 liter of water. Keep tightly capped and refrigerated when not in use.

SALTZMAN'S SOLUTION

Dissolve 5 g of sulfanilic acid in 900 ml of water, then add 50 ml of glacial acetic acid and 50 ml of the stock coupling reagent.

REAGENT FOR NITRITE IN HOCHHEISER'S SOLUTION

Dissolve 10 g of sulfanilic acid in 870 ml of water, then add 100 ml of the stock coupling reagent and 30 ml of concentrated $H_3PO_4$.

REAGENT FOR NITRITE PLUS NITRATE IN HOCHHEISER'S SOLUTION

Dissolve 10 g of sulfanic acid in 892 ml of water, then add 100 ml of the stock coupling reagent and 8 ml of concentrated $H_3PO_4$.

BUFFER SOLUTION

Prepare a solution that is 0.29 M in HCl and 0.10 M in $H_3BO_3$. Mix this solution with Hochheiser's solution in the analytical manifold and check the pH with a pH meter. Add HCl or NaOH as necessary to obtain a pH of 8.5.

REDUCTION COLUMN

Add 100 ml of 1-wt percent $HgCl_2$ to 10 g of 30- to 60-mesh cadmium powder or filings, stirring for 3 min. Allow the powder to settle and decant the liquid. Wash the amalgam several times with water until the water becomes clear. Prepare a column that has a length of 20 cm, an inside diameter of 5 mm, and a constriction in the middle. Bend the column into a U shape so that it will not drain when it is not in use. Plug the column with glass wool at the constriction and fill one side with amalgam, taking care not to let the column become dry. Cut off the ends of the column and attach tubing to each end so that the above solutions can be pumped through the column.

STOCK $NaNO_2$ STANDARD SOLUTION

In our experiments, we disolved 1.5 g of J. T. Baker $NaNO_2$ sticks that were previously analyzed and that assayed at 100.07 percent in 1 liter of water. To prepare working solutions containing 10 to 25 $\mu g$ of $NO_2^-$ per milliliter, dilute aliquots of the stock solution with water.

STOCK $NaNO_3$ STANDARD SOLUTION

Dissolve 1.848 g of $NaNO_3$ in 1 liter of water so that it has the same molarity as the $NaNO_2$ solution. To prepare working solutions containing 10 to 25 $\mu g$ of $NO_2^-$ per milliliter (when the $NO_3^-$ is reduced to $NO_2^-$), dilute aliquots of the stock solution with water.

NITROGEN-DIOXIDE STANDARD

Use a 2-cm-long, thick-walled diffusion tube, maintaining it at $28 \pm 0.1°C$ as described in UCRL-51057.

NITRIC-OXIDE STANDARD

Use two standards, one containing 95 ppm of NO in $N_2$, the other containing 9 ppm of NO in $N_2$.

EXAMPLE I

The above procedure was followed, using $N_2$ and air as carrier gas for several concentrations of $OsO_4$ in several concentrations of NaOH. Experiments were also conducted with those solutions with 0.2 volume percent n-butyl alcohol as a foaming agent in the scrubbing solution, and without the use of n-butyl alcohol. These experiments established the following: (1) that the scrubbing efficiency was the same for a given solution when either compressed air or $N_2$ was used as the carrier gas; (2) the scrubbing efficiency was the same for a given concentration of $OsO_4$ when the concentration of NaOH was varied between 0.05 and 0.25 molar; (3) that 40 ml of a solution containing 0.05 to 0.25 molar NaOH and $2.5 \times 10^{-5}$ molar $OsO_4$ or more will remove 90 percent or more of $NO_2$ from a stream of $N_2$ or pure air in the scrubbing system described; (4) the efficiency endures for at least 24 hours for flow rates of $NO_2$ in the range of 3-184 ng per min. in various flow rates of the carrier gas; and (5) that the addition of n-butyl alcohol does not change the scrubbing efficiency of the test solutions; (6) that $XeO_3$ and $Na_4XeO_6$ added to NaOH scrubbing solution improves the scrubbing efficiency by about a factor of two over the use of the same concentration of NaOH alone. Data for a number of experiments are shown in Table 1.

TABLE 1. [Effect of reagent addition on solution-scrubbing efficiency for $NO_2$ (Hochheiser solution used to remove $NO_2$ from air).]

| Run No. | Reagent added | Reagent conc. (M) | Sampling period (hr.) | $NO_2$ flow rate (ng/min.) | Carrier (all at 400 ml./min.) | $NO_2$ recovered, percent |
|---|---|---|---|---|---|---|
| 1 | | | 18.5 | 10 | $N_2$ | 43 |
| 2 | | | 22 | 87 | Air | 40 |
| 3 | $OsO_4$ | $2.0 \times 10^{-5}$ | 24 | 184 | $N_2$ | 97-100 |
| 4 | $OsO_4$ | $2.5 \times 10^{-5}$ | 24 | 30 | Air | 92 |
| 5 | $OsO_4$ | $2.5 \times 10^{-5}$ | 24 | 20 | Air | 93 |
| 6 | $OsO_4$ | $2.5 \times 10^{-5}$ | 24 | 11 | Air | 90 |
| 7 | $OsO_4$ | $2.5 \times 10^{-5}$ | 24 | 3 | Air | 89 |
| 8 | $XeO_3$ | $5.0 \times 10^{-3}$ | 24 | 175 | $N_2$ | 70 |
| 9 | $Na_4XeO_6$ | (1) | 17.5 | 175 | $N_2$ | 80 |

[1] Saturated.

EXAMPLE II

A second set of experiments were conducted to evaluate the efficiency of the system for removing $NO_2$ from ambient air within the laboratory. The experiments were conducted in the same manner as in (I), but no $NO_2$ standard was admitted and a pump was used to compress the ambient air and supply it to the sampling manifold. These tests shows the no $NO_2$ was passing through the static scrubbers in a 24 hour period if they contained $2.5 \times 10^{-5}$ M $OsO_4$ or more, by observation of the continuous analyzer. And that both nitrite and nitrate ions were present in the static scrubbers. Test solution of NaOH with no $OsO_4$ added invariably passed some $NO_2$ as shown by the continuous analyzer.

EXAMPLE III

A third set of tests were conducted to evaluate the scrubbing solutions in a field gas sampling of the type used by the Environmental Protection Agency (APCO), and to get a direct comparison of it with the research manifold. The field kit utilizes a vacuum pump to pull air at a high flow rate through a glass manifold containing five sampling tubes in parallel. The flow of air into each tube is controlled by a calibrated critical flow orifice. In our experiments, the air entered the sampling tube through an upturned glass fritt disc, 1 cm in diameter, and having pore size between 70 and 100 microns. The fritt was attached to a glass tube and extended to the bottom of the tube containing the test solution. The air was exhausted through the critical orifice to the atmosphere after passing through the solution. Forty milliters of each test solution was placed in polypropylene tubes about 3 cm diameter and 16 cm long. Polypropylene caps fitted with the inlet and outlet devices were sealed to the tubes containing the test solutions to prevent air leakage. All other connections for air flow through the manifold were made of teflon or glass tubing.

EXAMPLE IV

Simultaneous tests were conducted using the research sampling manifold and the field sampling manifold. Two test solutions were used concurrently in the field sampling manifold. The research manifold static scrubber contained 40 ml of $2.5 \times 10^{-5}$ M $OsO_4$ in 0.25 M NaOH. One sampling tube of the field sampling manifold also contained 40 ml of $2.5 \times 10^{-5}$ M $OsO_4$ in 0.25 M NaOH and the other one contained 40 ml of 0.25 M NaOH, but no $OsO_4$. The critical flow orifices caused 220 ml of air per min. to flow through the field sampling manifold test solutions, and that flow rate was also set on the research manifold. The results for two 24 hr. sampling periods are shown in Table 2. The continuous analyzer was used to test for $NO_2$ passing through the static test solution in the research manifold, and no $NO_2$ was found to pass during a 24 hr. period, therefore, it was concluded that the test solution containing $OsO_4$ removed all of the $NO_2$ from ambient air when sampled through the field sampling manifold.

Table 2. Nitrogen oxide absorption efficiency of two manifolds and solutions.

$NO_2$ collected (ng)

| Run | APCO manifold 0.25M NaOH | APCO manifold $2.5\times10^{-5}$M $OsO_4$ in 0.25M NaOH | Research manifold $2.5\times10^{-5}$ M $OsO_4$ in 0.25M NaOH |
|---|---|---|---|
| 1 | 5,200 | 10,100 | 10,100 |
| 2 | 5,400 | 9,300 | 9,400 |

While there has been described in the foregoing what may be considered to be preferred embodiments of the invention, modifications may be made therein without departing from the teachings of the invention and it is intended to cover all such as fall within the scope of the appended claims.

What we claim is:

1. In a process for colorimetrically determining the nitrogen dioxide content of a gaseous atmosphere, the steps comprising:

contacting a known volume of said atmosphere with an aqueous solution comprising about 0.05 to about 0.25 molar NaOH and an agent selected from the group consisting of $OsO_4$, $XeO_3$ and $Na_4XeO_6$ in amounts effective to promote the absorption of $NO_2$ to form nitrite therein, and adding sulfanilic acid and n-(1-naphthyl) ethylene diamine to the absorbate containing said nitrite to form a diazo dye for colorimetric determination.

2. A process as defined in claim 1 wherein said agent comprises a material selected from the group $OsO_4$ and $XeO_3$ present in a concentration in the range of about $2\times10^{-5}$ to about $4\times10^{-4}$ molar.

3. A process as defined in claim 1 wherein said agent comprises $Na_4XeO_6$ in a saturated solution thereof.

4. A process as defined in claim 1 wherein said absorbate is reduced by contact with cadmium amalgam at a pH of about 8.2 to 8.8.

5. A process as defined in claim 1 wherein the pH of the diazo dye final solution is in the range of about 1.9 to 2.3.

6. A process as defined in claim 5 including the further step of colorimetrically determining the concentration of nitrite in the absorbate for comparison with standard nitrite calibration curves to indicate the $NO_2$ content of said atmosphere.

7. An improved reagent for absorbing $NO_2$ from a gaseous atmosphere to form nitrite therein suitable for colorimetric determination of the $NO_2$ in a process as defined in claim 1 comprising an aqueous solution having a basicity equivalent to about 0.05 to about 0.25 molar NaOH and including an agent selected from the group consisting of $OsO_4$, $XeO_3$ and $Na_4XeO_6$ dissolved therein in amounts effective to promote the absorption of $NO_2$ to form nitrite therein.

8. A reagent as defined in claim 7 wherein said agent comprises a material selected from the group consisting of $OsO_4$ and $XeO_3$ in concentrations of about $2\times10^{-5}$ to about $4\times10^{-4}$ molar.

9. A reagent as defined in claim 7 wherein said agent comprises $Na_4XeO_6$ as a saturated solution.

* * * * *